June 25, 1963

P. A. MELLOW 3,095,097

GRAIN ELEVATOR CONTROL SYSTEM

Filed June 13, 1960

INVENTOR.
PAUL A. MELLOW
BY
*Jerry J Dunlap*

ATTORNEY

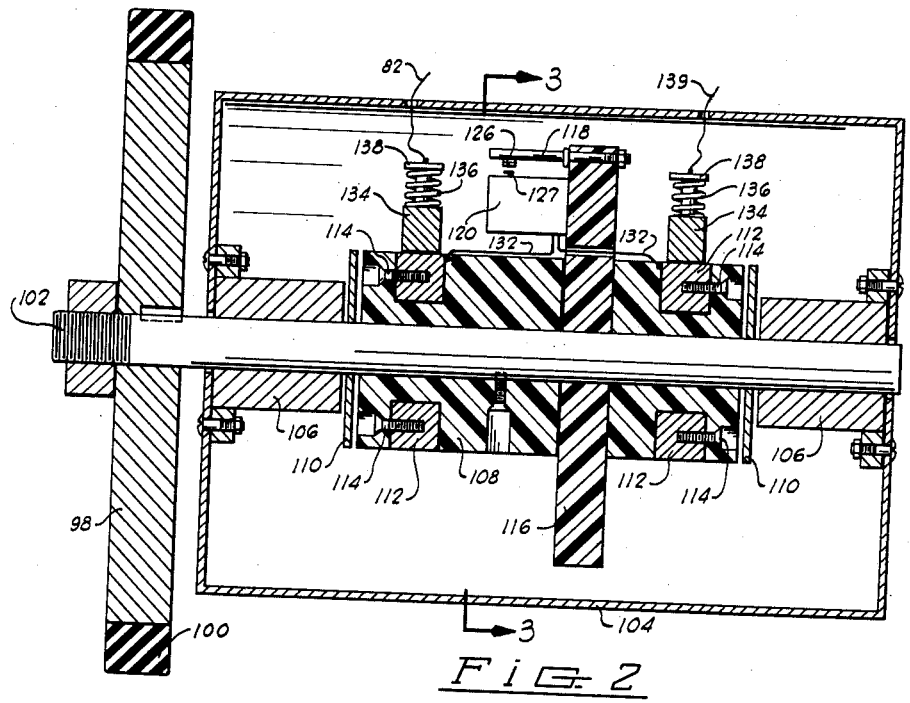
Fig. 2
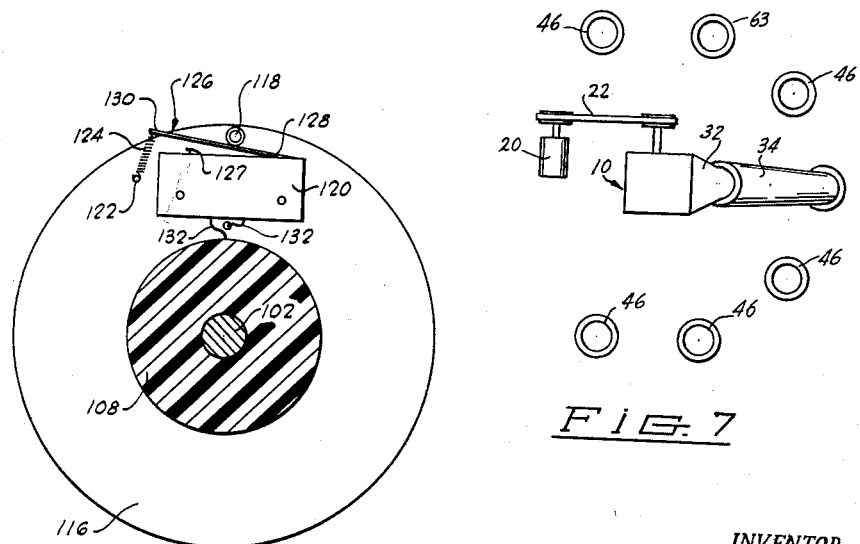
Fig. 3
Fig. 7
INVENTOR.
PAUL A. MELLOW
BY Jerry J Dunlap
ATTORNEY June 25, 1963
P. A. MELLOW
3,095,097
GRAIN ELEVATOR CONTROL SYSTEM
Filed June 13, 1960
3 Sheets-Sheet 3
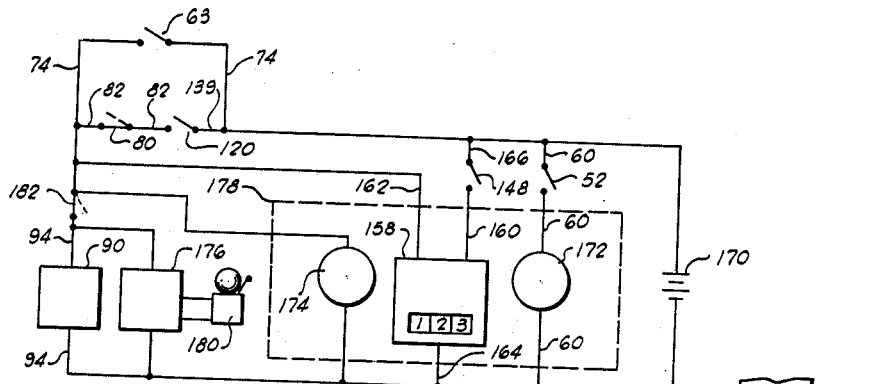
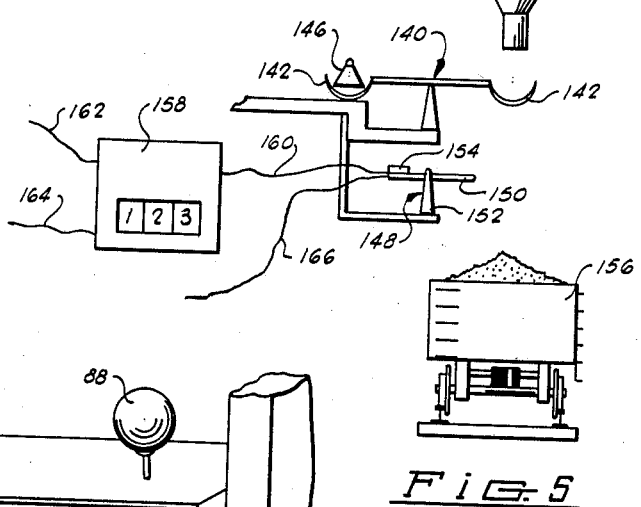
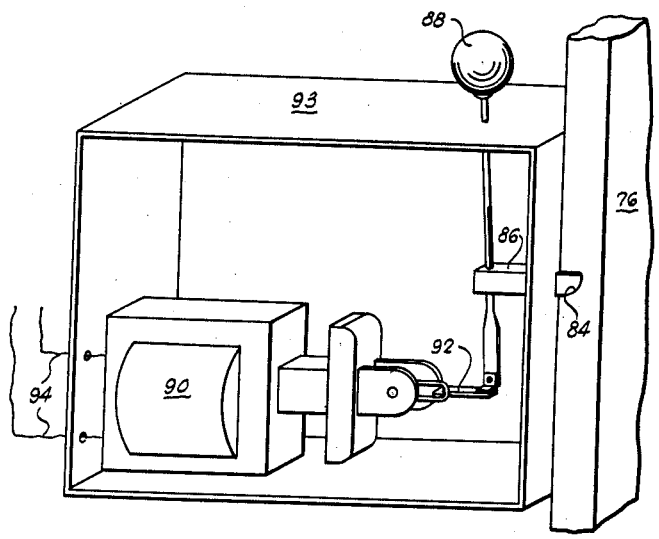
INVENTOR.
PAUL A. MELLOW
BY
*Jerry J Dunlap*
ATTORNEY

United States Patent Office 3,095,097
Patented June 25, 1963

3,095,097
GRAIN ELEVATOR CONTROL SYSTEM
Paul A. Mellow, Box 184, Hillsdale, Okla.
Filed June 13, 1960, Ser. No. 35,776
11 Claims. (Cl. 214—2)

This invention relates to a control system for automatically controlling the dispensation and distribution of particulate material. More particularly, but not by way of limitation, one aspect of this invention relates to apparatus for controlling the supply of grain to the endless conveyor used to carry grain from a lower level in a grain elevator to the top of the elevator for further distribution to various storage bins disposed around the periphery of the elevator.

As is well known to operators of grain storage elevators, the presence of large quantities of dry grain and the combustible dust therefrom in and about such elevators make the danger of fire or explosion a very real and ever-present one. The risks which arise from this danger are also fully considered by insurancee companies which have occasion to insure the property and equipment used in conjunction with elevator storage operations, or to insure the lives or health of personnel employed in such operations.

One of the primary sources of fire and explosion in grain elevators has previously been the blockage or jamming of the moving conveyor which is utilized to lift the grain from the ground level of the elevator upwardly to the top of the elevator so that it may be gravitated to the various storage bins. These conveyors are generally bucket-type, endless belt or chain conveyors which pass around drums or sprockets driven by an electric motor through a connecting belt or chain. The conveyor is enclosed in a surrounding casing or housing which extends upwardly in the center of the elevator from its lowest to its highest level. A supply chute communicates with the bottom or "boot" of the conveyor housing and is utilized to deliver grain brought to the elevator for storage therein to the buckets of the conveyor. The grain flows downwardly in the feed chute under the influence of gravity to the boot or bottom of the conveyor housing and is there picked up by the buckets of the conveyor and carried upwardly to the top floor or "head-house" of the elevator. After reaching the top of the conveyor, the grain is discharged downwardly and outwardly into a suitable discharge spout or the like. The discharge spout is a somewhat flexible conduit which may be selectively introduced into the opening at the top of any one of the several grain bins which surround the centrally located conveyor housing.

In accomplishing the transfer of grain from the farmer's vehicle to the storage bins of the elevator, a stoppage or blocking of the vertical conveyor may come about in several ways with the result that the conveyor belt is caused to slip on its pulleys and thereby produce a considerable amount of frictional heat which may lead to fire or explosion. Also in chain-type conveyors, the greatly increased torque imposed on the drive motor by the stalled conveyor causes it to heat up excessively. One way in which such stalling of the conveyor may come about is through the overfilling of one or more of the grain bins with the result that the grain is backed up through the discharge spout into the upper end of the conveyor, causing it to become jammed. To avoid such over-supply of grain to the bins, it has sometimes been necessary for personnel to be stationed in the head-house of the elevator to constantly observe the progressive filling of the bin so that the grain may be directed to another bin before the conveyor has become choked with grain which has backed up from an overfilled bin.

More recently, various types of mechanisms have been installed in the upper portions of the bins for the purpose of stopping the conveyor motor when the bin approaches a filled status or for sounding a warning to notify an operator that the grain is approaching the top of the bin. In the latter case, stalling of the conveyor still frequently results due to the negligence of the operator in promptly responding to the warning signal to transfer the discharge spout to another bin or to stop the conveyor motor. Moreover, even in the arrangements which provide for automatic cut-off of the conveyor motor when the grain approaches the top of a storage bin, this solution to the problem of stalling of the conveyor is not entirely effective. This is because such conveyors generally attain a considerable amount of momentum while they are in operation and the disconnection of the power to the conveyor motor does not actually halt the continued motion of the conveyor until a substantial addition of grain to the storage bin has been effected. Also, grain remains in the conveyor after it has stopped, thereby imposing an undue load on the conveyor motor when the conveyor is again placed in operation.

The conveyor may also become stalled with consequent risk of fire as a result of an over-supply of grain to the boot of the conveyor housing. If the grain is fed too fast into the feed chute, it may accumulate in the boot of the housing considerably faster than it can be carried upwardly by the buckets. The accumulated grain then becomes packed in the boot of the housing or may be jammed between one or more of the buckets and the inner wall of the housing, causing the conveyor to stall.

Fires resulting from the choking or stalling of the conveyor often occur at the top of the conveyor where the motor driving the conveyor and the pulley frictionally engaging the conveyor belt are located. This location at the top of the grain elevator, termed the head-house, is relatively inaccessible and fires which occur at such location are not usually immediately detected. Also, because of the height of the elevator and the inaccessibility of the head-house, such fires, once located, are extremely difficult to fight. Moreover, all grain elevator operators are familiar with the problem of clearing a choked-up or stalled conveyor. Frequently, as much as an hour's time is consumed in clearing the jammed conveyor and getting the system into operation again. Wasted time and labor result and the more serious consequence occurs that the farmers who would otherwise patronize such elevators take their grain elsewhere rather than wait for storage operations to be resumed.

Another situation which has existed in the operation of grain storage elevators and which may be said to be a contributing factor to the incidence of fires in such elevators, as well as a situation which gives rise to the unrelated problems of lost time and uneconomical operation, is the scattering of quantities of grain over the floors of the elevator and failure to properly transfer the grain from one portion of the elevator to another. One instance of such careless distribution of the grain arises from the failure of employees to properly align the outlet of the discharge spout which carries the grain from the top of the conveyor to the bins with the opening at the top of the bin. This misalignment results in a portion of the grain flowing out onto the floor of the head-house rather than into the bin being filled and requires the employment of personnel to periodically shovel the loose grain standing on the floor of the head-house into the bins. Naturally, considerable waste occurs as a result of such careless operation and it will also be apparent that the grain lying on the floor of the head-house enhances the fire hazard which endangers property and the lives of personnel and increases the insurance rates which elevator operators must be prepared to pay.

Further waste frequently occurs in the transfer of grain from the top of the conveyor in the elevator to scales in characteristic installations which weigh the grain in batches and then dump it either for loading purposes or inventory purposes. Previously, the discharge spout from the top of the elevator has been connected to a chute leading to the grain scales and the grain has been continuously transferred via the discharge spout and chute until the scales have weighed and dumped the amount of grain which it is desired to load or inventory. After this time the grain will continue to be dumped on the scales or on the ground until an operator has either shifted the discharge spout to an empty grain bin or has removed the power to the conveyor. In the latter case, as has been pointed out previously, the conveyor will continue to turn for a period of time due to its momentum, and this, of course, will result in the delivery of more grain than is desired to the scales, from whence it can only be dumped into a waste container or allowed to fall to the floor of the elevator.

Broadly, the present invention contemplates an elevator control system which comprises a combination of control units which act conjunctively to permit the operation of grain elevators with fewer personnel, and the reduction of the safety hazards and economic inefficiencies which have previously characterized grain storage operations.

More specifically, the present invention comprises an elevator control system which automatically maintains constant control of the supply of grain to the storage bins of the elevator and which also automatically blocks the supply of grain to the conveyor at any time the conveyor tends to become clogged for any reason or at such time as a bin which is being filled approaches the filled condition. The elevator control system of this invention is further characterized in having an automatic control which is responsive to the weighing out upon the elevator scales of a desired or predetermined amount of grain to stop the supply of grain to the scales and thereby avoid grain waste. A central control panel is provided which may be mounted in the elevator areaway or in a nearby office building, which control panel includes visible and audible signals which indicate to an observer the times at which the several bins become filled with grain, which bins are full, the time when the grain discharge spout has been properly aligned with a bin for the delivery of grain thereto, and also which of the bins is being filled with grain. The central control panel also has an electrical counter for constantly indicating to the observer the amount of wheat or grain which has been weighed upon the elevator scales, and for actuating audible and visible signals located upon the control panel when the total amount of grain which it is desired to weigh out has been loaded upon the scales and transferred by the scales to a receiving station.

It is a broad object of this invention to provide an automatic control system which improves the efficiency and safety of distribution and storage operations involving particulate material.

Another object of this invention is to provide a grain elevator control system which reduces the waste of grain occurring in transfer operations conducted in connection with the operation of grain elevators.

Another object of this invention is to provide automatic controls effective during the transfer of grain to and from a grain elevator whereby the number of operating personnel previously required to effect such transfers may be reduced.

A further object of this invention is to provide a grain elevator control system characterized by a combination of safety devices which act conjunctively to greatly reduce the danger of fire and explosion occurring in such elevators.

An additional object of this invention is to provide a system for automatically weighing a predetermined quantity of grain being delivered from a grain elevator and for automatically halting the supply of grain to the weighing apparatus when such predetermined quantity has been weighed.

Yet another object of this invention is to permit the automatic control from a remote location of bin filling operations in a grain elevator.

Another object of this invention is to provide a grain elevator control system which is responsive to a reduction of the speed of movement of the grain conveyors of such elevators to block the supply of grain to such conveyors and thereby prevent their stalling due to becoming clogged or jammed with excessive grain.

Another object of this invention is to provide a grain elevator control system which is simple in construction, relatively inexpensive to manufacture, and characterized by a long and trouble-free service life.

Other objects and advantages will be evident from the following detailed description, when read in conjunction with the accompanying drawings which illustrate my invention.

In the drawings:

FIGURE 2 is a vertical sectional view taken through the center of a centrifugal switch utilized in the present invention.

FIGURE 3 is a sectional view taken along the lines 3—3 of FIG. 2.

FIGURE 4 is a perspective view of a portion of the gate utilized in the present invention to block the supply of grain to the conveyor, and of the electrical solenoid and latching system used to operate said gate. One side of the solenoid housing is shown removed.

FIGURE 5 is a diagrammatic view showing the manner in which the scale control switch of the present invention is mounted relative to the weighing scales usually associated with grain elevators.

FIGURE 6 is a schematic circuit diagram showing the various electrical components of the elevator control system of this invention.

FIGURE 7 is a diagrammatic plan view of the head house floor of a grain elevator seen from a point above the vertical endless conveyor of the system and showing portions of the control system of the present invention.

Figure 1:
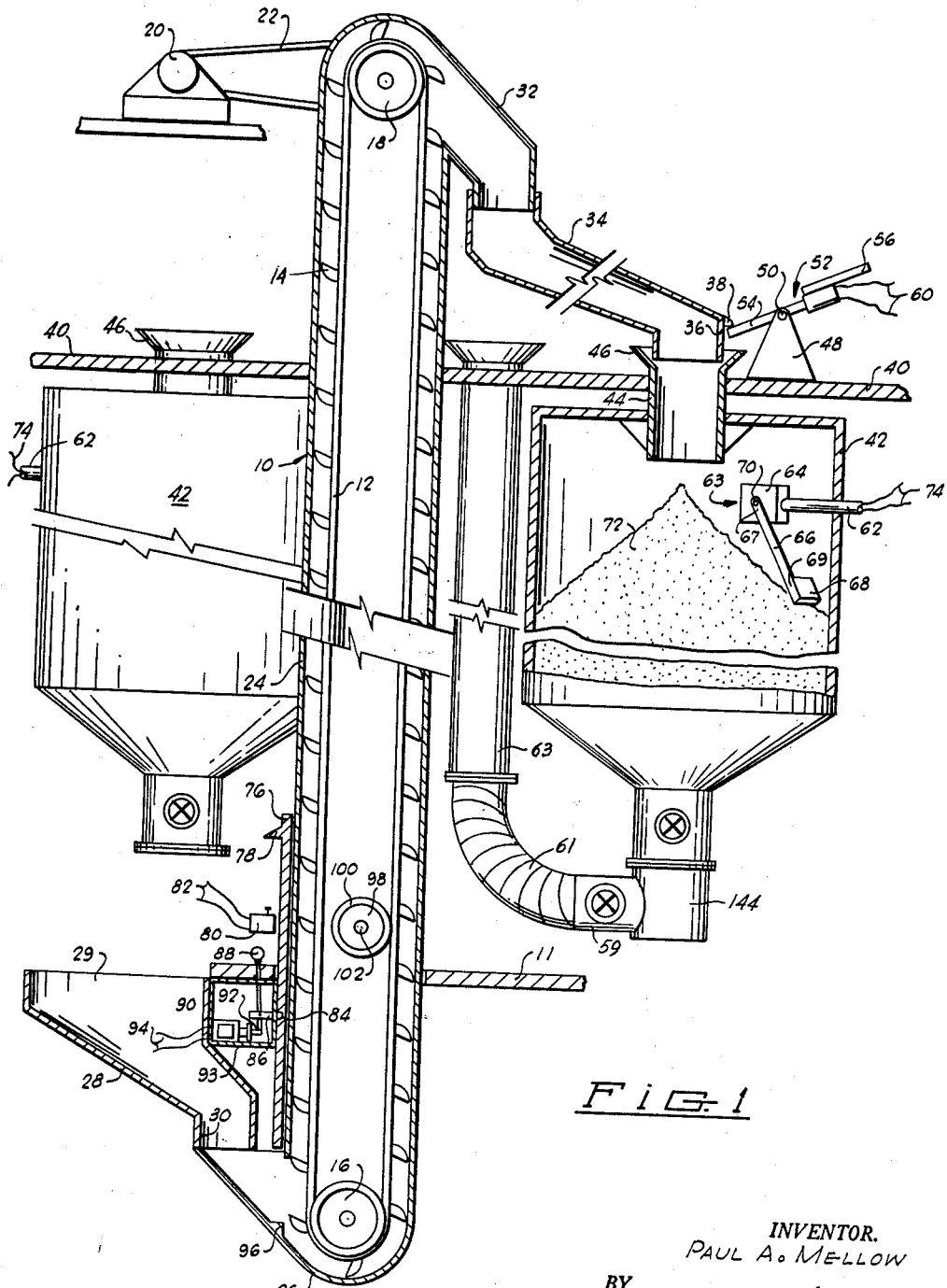
FIGURE 1 is a vertical sectional view taken through the center of a grain elevator and illustrating, in section, a vertical bucket-type endless conveyor, and a filled grain bin as they are equipped with portions of the elevator control system of the present invention.

Referring to the drawings in detail, and particularly to FIG. 1, reference character 10 designates generally an endless bucket-type conveyor utilized to transport grain from a lower level in a grain elevator to the upper portion of the elevator. Reference character 11 designates the ground floor of the elevator. The conveyor 10 comprises an endless belt 12 to which are secured a series of spaced buckets 14. The belt 12 passes over pulleys 16 and 18 at its lower and upper ends respectively. The pulley 18 located at the top of the elevator is driven by an electric motor 20 through a belt or chain 22. A vertically-extending housing 24 encloses the buckets 14 and belt 12 of the conveyor and terminates at its lower end in a boot portion 26. Each of a plurality of grain feed spouts or chutes 28, only one of which has been shown in FIG. 1, has a large, open upper end 29 approximately level with the ground floor 11 of the elevator and a smaller lower end 30 opening into the boot 26 of the conveyor housing 24. The top of the conveyor housing 24 is formed with an integral neck 32 projecting outwardly and downwardly therefrom. A grain discharge spout 34 fits tightly over the end of the neck 32 and may be rotated about the neck in a manner subsequently to be described. The discharge spout 34 has a lower end portion 36 which carries an outwardly projecting stud 38. The lower end 36 of discharge spout 34 terminates closely adjacent a platform or distributor floor 40 of an upper level of the grain elevator termed the head-house.

Located just beneath the distributor floor 40 of the head-house and extending downwardly in the grain elevator are a plurality of grain storage bins 42, the general arrangement of which relative to the conveyor is shown in FIGURE 7. Each of the storage bins 42 has a neck 44 which extends upwardly through an opening in the distributor floor 40 of the head-house and terminates at its upper end in an outwardly flared portion 46. A bracket 48 is mounted on the distributor floor 40 of the head-house adjacent the neck 44 of each grain storage bin 42. Each of the brackets 48 journals a pivot pin 50 upon which is mounted a switch assembly designated generally by reference character 52. The switch assembly 52 may conveniently comprise an elongated housing 54 which projects outwardly from the bracket 48 and is engaged by stud 38 when the end 36 of the discharge spout is inserted in the flared portion 46 of neck 44. Located in the elongated housing 54 is a mercury switch (not shown) or other suitable switch element adapted to be closed when the switch assembly 52 is pivoted downwardly by contact with stud 38 in the manner shown in FIG. 1. When the lower end 36 of the discharge spout 34 is removed from the flared end portion 46 of neck 44, the switch assembly 52 is returned to a substantially horizontally position by the action of a counterweight 56 secured to one end of housing 54. Electrical leads 60 connect the switch assembly 52 with an electrical circuit subsequently to be described.

To facilitate the discharge of grain from the elevator to a grain weighing scale hereinafter to be described, a movable discharge chute 144 is positioned beneath the bins 42 and is adapted for connection to the respective bin beneath which it is selectively positioned. The discharge chute 144 carries a suitable side arm 59 or other appropriate connecting member which may be connected through a flexible conduit 61 to a suitable pipe 63 into which grain may be channeled from the discharge spout 34 when it is desired to weigh out grain directly from the conveyor 10 instead of from one of the bins 42.

A tubular conduit 62 extends through the side of each of the storage bins 42 at a location near the top of each bin and carries at its end disposed inside the bin a switch assembly 63. An arm 66 is connected at one of its ends 67 to a dust-proof switch housing 64 and carries a paddle 68 at its opposite end 69. The end 67 of arm 66 is secured to one end of a shaft 70 which passes through the side of the switch housing 64 and is connected at its other end to a mercury switch (not shown) or other switch of suitable type adapted to be closed upon actuation of the arm 66 by contact with grain 72 located in the grain storage bin 42. The electrical leads connected to the switch (not shown) are designated by reference character 74.

A plurality of gates 76 corresponding in number to the number of feed chutes 28 extend vertically alongside the conveyor housing 24 adjacent its lower end. Near its upper end each gate 76 carries a stud 78 which is adapted to make contact with and open a normally closed switch 80 when the gate is closed in a manner hereinafter to be described. The electrical leads to switch 80 are designated by reference character 82. Each gate 76 has a detent 84 which cooperates with a latch 86 when the gate is open. The latch 86 may be withdrawn from the detent 84 by means of a manual control lever 88 or by energization of a solenoid 90 which is connected to the latch through a mechanical linkage 92. The solenoid 90 and mechanical linkage 92 are enclosed in a suitable dust-proof housing 93. Electrical leads 94 from the solenoid are connected to an appropriate electrical circuit in a manner hereinafter to be described. A small step or abutment 96 is secured to the inner wall of the boot 26 of the elevator housing 24 for cooperation with each of the gates 76 when the latter are closed. The number of solenoids 90 which are required may correspond to the number of feed chutes 28 and gates 76 utilized, or in some instances a single solenoid may be utilized to release all of the gates.

A disc 98 is located between pulleys 16 and 18 of the conveyor 10 and carries a material 100 having a high coefficient of friction at its outer periphery. The disc 98 and its peripheral material 100 are of a diametric size to frictionally engage the inner surface of at least one leg of the belt 12. The disc 98 is coaxially secured to a shaft 102 for rotation therewith.

FIG. 2 illustrates a centrifugal switch which is utilized in the present invention in conjunction with the disc 98 shown in FIG. 1. The disc 98, as has been previously indicated, is coaxially keyed to the shaft 102 for rotation therewith. The shaft 102 extends through a housing 104 and is rotatably journaled in bushings 106 located adjacent each end of the housing and secured thereto. A hub 108 of insulating material is keyed coaxially on the shaft 102 and is centrally located within housing 104. Spacers 110 are disposed between each end of the hub 108 and the bushings 106. The hub 108 carries adjacent each of its ends a pair of circumferential copper rings 112, each of which extends around the periphery of the hub and is secured thereto by means of screws 114 which are countersunk from each end thereof. The hub 108 is coaxially secured to a disc 116 of insulating material which is disposed intermediately of the length of the hub 108. Closely adjacent its outer periphery, the disc 116 carries a stop projection 118. A microswitch 120 is secured to the side of the disc 116 from which the stop projection 118 projects and is spaced radially inward on the disc 116 from the stop projection.

As will be apparent in referring to FIG. 3, the disc 116 carries a hook 122 or other suitable connecting means to which is connected a tension spring 124. A resilient spring metal lever arm 126 is connected at one of its ends 128 to the microswitch 120 and at its opposite end 130 to one end of the tension spring 124. A pair of electrical leads 132 connect the microswitch 120 with the annular copper rings 112 mounted upon the hub 108. Sliding contact with the copper rings 112 is established by means of a pair of carbon brushes 134 which are urged into frictional contact with the copper rings 112 by means of compression springs 136 disposed between contacts 138 carried by the housing 104 and each of the brushes. The contacts 138 are connected in an electrical circuit subsequently to be described by means of electrical leads 82 and 139.

FIG. 5 diagrammatically illustrates the manner in which the scale control switch of the invention is mounted relative to the weighing scales usually associated with grain elevators. A scale 140 having a pair of pans 142 is located beneath the grain discharge chute 144 hereinbefore described. The right-hand pan 142 is aligned to receive grain from the discharge chute 144 and the other pan carries a counterweight 146 which is of a size selected to permit the scale to be tilted and to release the grain in the right-hand pan 142 when a predetermined quantity of grain, such as a bushel, has been delivered to the right-hand pan by the discharge spout. Located beneath the scale 140 is a pivotally-mounted, normally open switch assembly 148. The switch assembly 148 may conveniently comprise a tubular housing 150 which is pivotally supported by a bracket 152. The tubular housing 150 carries a counterweight 154 at one of its ends and its other end extends outwardly from the bracket 152 and intersects the arc described by the right-hand pan 142 of the scale as it moves downwardly to discharge the grain which has been delivered thereto. The grain which is discharged from the right-hand pan 142 of the scale 140 falls into an appropriate receiver such as the railroad car 156 depicted in FIG. 5.

An electrical counter 158 is connected by electrical lead 160 to the switch assembly 148 and by electrical leads 162 and 164 to an electrical circuit in a manner hereinafter to be described. An additional electrical lead 166 connects the switch assembly 148 to a source of electromotive force (not shown).

FIG. 6 schematically illustrates the electrical circuitry of the present invention. A source of electromotive force 170 is connected in the manner shown to the switch elements which have previously been described and also to a green light 172, a red light 174, the electrical counter 158, a transformer 176 and the solenoid 90. The red and green lights 174 and 172, respectively, and the electrical counter 158 are all located in a control panel 178 which is illustrated in dashed lines in FIG. 6. Connected to the transformer 176 is a bell 180. To summarize the circuit, switch assembly 63 is connected in series with solenoid 90, transformer 176, and red light 174. Switch assembly 52 is connected in parallel with switch assembly 63 and is connected in series with green light 172. Scale switch assembly 148 is connected in parallel with switch assembly 63 and is connected in series with electrical counter 158, solenoid 90, transformer 176 and red light 174. Centrifugal microswitch 120 is connected in parallel with switch assembly 63 and is connected in series with normally closed switch 80, solenoid 90, transformer 176 and red light 174. A switch 182 is provided for the purpose of disconnecting the solenoid 90, transformer 176 and bell 180 from the circuit when desired.

*Operation*

Grain which is delivered to the elevator for storage therein is unloaded from the farmer's truck or conveyance into the upper end 29 of the feed chute 28. The grain slides downwardly in the feed chute 28 past its open lower end 30 into the boot or lower portion 26 of the conveyor housing 24. As the grain reaches the boot 26, it is scooped up by the buckets 14 carried by the belt 12 of the moving conveyor 10 and is carried upwardly in the elevator by the conveyor. The belt 12 of the conveyor 10 is driven by the pulley 18 which is connected by means of a belt or chain 22 to an electric motor 20. After the grain has been carried to the top of the elevator in the buckets 14 of the conveyor 10, it is discharged from the buckets as they pass over the top of the pulley 18 and commence their descent downwardly. The grain which is discharged from the buckets 14 falls downwardly via the neck 32 of the conveyor housing 24 into the discharge spout 34. In a typical grain elevator arrangement, a number of grain storage bins are peripherally arranged around the elevator about the centrally located conveyor housing 24. One of these grain storage bins 42 is depicted in FIG. 1. The discharge spout 34 is connected to the neck 32 of the conveyor housing 24 so that the discharge spout may be swung about the neck and brought into communication with the various grain bins of the elevator. The grain is conveyed via the discharge spout 34 from the neck 32 of the conveyor housing 24 to the flared upper end 46 of the neck 44 of each of the grain bins 42 or, if desired, to the upper end of the pipe 63.

The function and manner of operation of the switch assembly 52 may be better understood by referring to FIG. 6 and FIG. 1 conjunctively. When the elevator operating personnel have properly located the lower end 36 of the discharge spout 34 in alignment with the flared end 46 of the neck 44 of storage bin 42, the shoulder 38 will contact and depress the tubular housing 54 of the switch assembly 52. As the switch assembly 52 is tilted, the switch contained in the housing 54 is closed and the circuit through switch 52 is thereby closed to light the green light 172 located on the control panel 178. A plurality of such switches and lights are, of course, provided and correspond in number to the number of storage bins 42 which are located in the elevator. Thus, an operator who is observing the control panel 178 will be informed as to which of the storage bins 42 is about to be filled and also will be informed of the fact that the discharge spout 34 is properly aligned with the neck 44 of the bin 42 for the delivery of grain thereto. This feature of the present invention therefore is effective in preventing the considerable waste of grain which previously occurred due to misalignment of the discharge spout 34 with the inlet to the grain bin 42 and the loss of time which was involved in recovering grain scattered about upon the floor 40 of the head-house as a result of such misalignment.

After the discharge spout has been placed in communication with the bin 42, the grain 72 is delivered to the bin until it reaches a height in the bin substantially equal to that depicted in FIG. 1. When the grain 72 in the storage bin 42 approaches the height shown in FIG. 1, it comes in contact with the paddle 68 at the lower end 69 of arm 66. As additional grain is poured into the bin 42, and as the height of grain in the bin reaches the position shown in FIG. 1, the arm 66 is moved outwardly and tends to approach the angle of repose of the grain as the paddle 68 is moved upwardly. This actuation of the arm 66 closes a switch (not shown) located in the housing 64 and mounted on the end of the shaft 70.

The purpose of the switch assembly 63 of the present invention is to prevent the overfilling of the grain bins 42 so that grain is not backed up into the discharge spout 34 and neck 32 to block or jam the conveyor 10. The danger of fires or explosions arising from such blockage has previously been explained.

The manner in which the switch assembly 63 is effective to prevent the overfilling of the bin 42 will now be described. When the grain 72 has reached a height in the bin 42 such that arm 66 is pivoted to close the switch (not shown) contained within housing 64, the electrical circuit depicted in FIG. 6, which includes the switch 63 and other elements which will be mentioned, is closed. Thus, upon the closure of switch assembly 63 as the bin 42 becomes filled, current is permitted to flow through the solenoid 90, the transformer 176 and the red light 174 which is located on the control panel 178. The red light 174 is therefore lighted and an operator observing the control panel becomes aware of the fact that the grain bin has reached a filled status. Simultaneously, the bell 180 connected to transformer 176 is sounded and solenoid 90 is energized. When the solenoid 90 is energized, it acts through the mechanical linkage 92 to withdraw the latch 86 from the detent 84 in gate 76. The withdrawal of the latch 86 from the detent 84 permits the gate 76 to slide downwardly into the boot 26 of the conveyor housing 24 and come to rest upon the abutment 96. With the gate 76 in this position, the supply of grain from the feed chute 28 to the boot 26 is blocked by the gate. Thus, no further grain can be carried upwardly by the buckets 14 of the conveyor 10. It will be obvious, of course, that grain which is already contained in the buckets 14 which are moving upwardly when the gate 76 is closed will be discharged from the conveyor 10 into the neck 32 and discharge spout 34 and will come to rest in the top of the bin 42. Accordingly, the location of the switch assembly 63 in the top of the grain storage bin 42 is such that after the switch is actuated to closure by contact with the grain, a sufficient space will remain in the top of the bin to easily accommodate such additional grain as will, at that time, be contained within the upwardly moving buckets 14 of the conveyor 10.

Summarizing, therefore, the purpose and operation of the switch assembly 63, it may be stated that this switch assembly is effective to prevent the overfilling of any of the grain bins 42 of the elevator in which it is located by blocking the supply of grain to the conveyor 10 when the bin has been properly filled. The switch assembly 63 is also effective to notify an operator observing a centrally located control panel that the bin 42 has reached a filled status and that the discharge spout 34 should be shifted to the next bin which is to be filled. Although but a single switch assembly 63 and its associated solenoid, bell, and warning light have been depicted and described, it will be apparent to those skilled in the art that such automatic grain control switch assemblies and associated warning systems may be installed in each of the grain bins 42 located in the elevator. The control panel 178 will then present to the observation of an operator a series of warning lights 174 which are actuated as the various bins are filled, and which will indicate to the operator constantly which of the bins is being filled or has reached a filled status. After the operator has been warned by the ringing of bell 180 and after the solenoid 90 has been energized to drop the gate 76, these elements may be disconnected from the circuit by opening the switch 182. The lights 174 will remain lighted to continuously indicate the status of the elevator storage bins.

As has been previously discussed, the jamming or blocking of the conveyor 10 may arise, not only through the overfilling of one of the grain storage bins 42, but may also come about through the introduction of an excessive amount of grain to the boot 26 of the conveyor housing 24 and from the agglomeration or compacting of grain between the buckets 14 and the conveyor housing 24. The elevator control system of the present invention safeguards against stalling of the conveyor 10 due to such blockage by the employment of the novel centrifugal switch assembly depicted in FIGS. 2 and 3. As the conveyor belt 12 is driven in rotation by frictional contact with the pulley 18, it in turn drives the disc 98 through frictional contact with the peripheral member 100 which is carried by the disc. Thus, the rotational speed of the disc 98 will, at all times, be directly related to the linear speed of the conveyor belt 12 by which it is driven. Since the disc 98 is keyed to the shaft 102, and since the hub 108 is also keyed to the shaft 102, as well as being rigidly connected to the disc 116, it follows that the disc 116 will also have a rotational speed which is correlated with the linear speed of belt 12.

Referring now to FIGS. 2 and 3, it will be observed that the microswitch 120 which is secured to one face of the disc 116 is adapted to be opened when the disc 116 is rotated at a relatively high rate of speed and is adapted to be closed when the disc 116 is rotated at a slow speed or is stopped. Such opening and closing of the microswitch 120 is accomplished by means of the resilient lever 126 and the tension spring 124. Thus, as the disc 116 is rotated at a high speed, the end 130 of the resilient lever 126 is urged outwardly toward the periphery of the disc 116 under the influence of centrifugal force. The tension spring 124 which is secured at one end to the lever 126 and at its other end to the disc 116 opposes the outward movement of the end 130 of the lever. The tension of the spring 124 is adjusted so that the lever 126 will overcome the tension of the spring when the disc 116 is rotated at a speed which corresponds to the linear speed of the conveyor belt 12 during normal operation. The spring 124, however, is sufficiently strong that it will pull the resilient lever 126 into contact with the contact 127 of the microswitch 120 at any time the disc 116 slows down to a rotational speed which is less than it normally attains when the conveyor 10 is operating at its normal speed when no stalling due to blockage or jamming has occurred. It will be apparent from the discussion thus far that during normal operation of the conveyor 10, that is, when the belt 12 is moving freely on its pulleys 16 and 18 and no jamming or blockage of the conveyor has commenced to occur, the centrifugally operated microswitch 120 will remain open. However, at any time that the belt 12 of the conveyor 10 commences to slow down in its linear travel and slip about its pulleys 16 and 18 due to blockage or jamming of the conveyor for any reason, the microswitch 120 will be immediately closed as the spring 124 overcomes the centrifugal force tending to urge the resilient lever 126 outwardly.

As shown in FIG. 6, when the normally open microswitch 120 is closed due to a tendency of the conveyor 10 to stall, the circuit is completed through normally closed switch 80 and the solenoid 90 is energized along with the sounding of the visible and audible alarm signals represented by the red light 174 and the bell 180. The solenoid 90, when energized, performs the same function as has previously been ascribed to it in connection with the description of the operation of switch assembly 63. That is, the solenoid acts through the mechanical linkage 92 to withdraw the latch 86 from the detent 84 of gate 76. This permits the gate 76 to fall downwardly across the entrance to the boot 26 of the conveyor housing 24 and thereby to block the supply of grain from the feed chute 28 to the boot 26.

Referring now to FIG. 1, it will be perceived that as the gate 76 slides downwardly to exclude further quantities of grain from entering the boot 26, the stud 78 carried by the upper portion of the gate 76 contacts the normally closed switch 80 and causes this switch to open. The opening of the normally closed switch 80 breaks the circuit to the solenoid 90, the bell 180 and the light 174 so that the solenoid 90 does not remain energized for an undesirable period of time. From what has been said, it should now be apparent that the function of the centrifugal switch system depicted in FIG. 2 is to sense the slightest stalling of the conveyor 10 and to prevent the further access of grain to the boot 26 of the conveyor until such slight jamming or blockage as has occurred has had an opportunity to clear itself.

A final feature of the elevator control system of this invention relates to a component of the system which permits a finer and more economical control to be maintained over grain which is being weighed out and delivered by the scales customarily associated with grain elevator storage systems. The relationship of this component of the control system to such scales has been schematically indicated in FIG. 5. When it is desired to weigh out specific quantities of grain either from one of the storage bins 42 of the elevator or from the discharge spout 32 connected to the conveyor, the grain is delivered via a discharge chute 144 to a double-pan scale 140 of the general type schematically indicated in FIG. 5. A counterweight 146 corresponding to the weight of a bushel of grain or other convenient quantity is placed upon one of the pans 142 of the scale 146 and the discharge chute 144 is brought above the other pan of the scale.

As the grain is dispensed from the chute 144, it is accumulated in the right-hand pan 142 of the scale 140 until the weight of grain in such pan is equal to the counterweight 146 held by the left-hand pan 142. At this time, or as soon as a very slight amount of grain in addition to such weight is added to the right-hand pan 142, the scale 146 will tilt downwardly on the right-hand side and the grain contained in the right-hand pan 142 will be released and will fall downwardly into an appropriate receiving station, such as a railroad car 156. In accordance with the present invention, a switch assembly 148 is located relatively to the scale 140 so that the switch will be contacted by the downwardly moving right-hand pan 142 of the scale and will be tilted thereby as the pan moves downwardly to discharge its load of grain. The downward tilting of the tubular housing 150 of switch assembly 148 causes the switch located in the housing to close.

As shown in FIG. 6, the closure of switch 148 permits current to flow to the electrical counter 158 and the counter mechanism is actuated upon each closure of the switch. Any appropriate type of electrical counter may be employed, but I prefer to use a Veeder-type counter, the operation of which will now be described. The elevator operator determines in advance of a grain-weighing operation how much grain he desires to weigh out in terms of the number of units represented by the counterweight 146 utilized with the scale 140. Thus, the operator may decide, for example, that he desires to weigh out 123 bushels of grain. As has already been indicated, the counterweight 146 may be substantially equivalent to the weight of a bushel of grain. Having determined that 123 bushels of grain is the amount to be weighed and delivered to a receiving station by the scales 140, the operator then sets this figure upon the Veeder counter 158. The weighing of the grain is then commenced. Each time the scale 140 tilts downwardly to deliver a bushel of grain to the railroad car 156, the switch assembly 148 is closed and the circuit through the counter is completed. Upon the completion of the circuit through the counter, the counter mechanism is actuated and the number indicated upon the counter and visible to the operator is reduced by one. As the scale moves upwardly in returning to its horizontal position following the dispensation of the grain contained in the pan 142, the switch assembly 148 is again open and the circuit to the counter is broken. This process is repeated until the scale 140 has been tilted 123 times to deliver 123 bushels of grain to the railroad car 156. At this time, the numbers registered on the Veeder counter 158 have been steadily decreased until they have reached a zero reading. Upon the final actuation of the switch assembly 148, that is, upon the delivery by the scales of the final bushel of grain which it is desired to weigh out, the Veeder counter 158 closes the electrical circuit connecting the switch 148 to the solenoid 90, transformer 176 and red light 174. As has been previously described, the supply of current to these elements of the elevator control system energizes the solenoid to allow the gate 76 to be dropped across the entrance to the boot 26 of the conveyor 10, and simultaneously actuates audible and visible alarm signals at the control panel 178. The operator is therefore notified that the predetermined amount of grain has been weighed out upon the scale 140. Moreover, when grain is being delivered to the scale 140 from the discharge spout 34 via the chute 144, the further supply of grain to the conveyor 10 is halted by the operation of the gate 76.

As has been previously indicated, in some types of grain elevators a plurality of feed chutes are utilized to convey grain to one or more boot portions of one or more conveyors. In such cases a plurality of solenoids and gates are utilized in substantially the same manner as the single solenoid and gate which have been described above.

From the foregoing discussion, it will be apparent that the grain elevator control system of the present invention is characterized by many features which greatly improve the safety of grain elevator operations, and also improve the efficiency and economy of such operations. The automatic features of the invention permit the reduction of the number of operating personnel previously required to maintain and operate such elevators, and also effectively reduce the waste of grain which has tended to occur by reason of the carelessness of such personnel in performing various manual functions.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

I claim:

1. In a grain elevator having a plurality of storage bins, a vertical conveyor, a discharge spout adjustably connected to the top of said conveyor for delivering grain to said bins, scales for weighing and delivering grain, and a discharge chute over said scales and connectible to said bins and said discharge spout for delivering grain to said scales—an elevator control system which comprises:

(a) means for simultaneously halting the supply of grain to said conveyor and providing visible and audible signals in response to the filling of said bins with grain;

(b) means for indicating the proper alignment of said discharge spout with each of said bins as said bins are filled from said discharge spout and for indicating the bin which is being filled;

(c) electrical circuit means electrically connected to said grain halting and signal providing means and including a first switch operative in response to loading and unloading of said scales, and a counting device actuated by the opening and closing of said first switch and connected to said grain halting and signal providing means for simultaneously halting the supply of grain to said conveyor and providing visible and audible signals when a predetermined quantity of grain has been delivered by said scales and indicated on said counter; and (d) means responsive to the speed of said conveyor for halting the supply of grain to said conveyor.

2. An elevator control system as claimed in claim 1 wherein said means for halting the supply of grain to said conveyor in response to the filling of said bins comprises an electrical circuit including a normally open height control switch mounted in the upper portion of each of said bins; an arm connected to said height control normally open switch and extending downwardly into the respective bin in which said height control normally open switch is mounted, said arm being movable in response to contact with the grain in said bin to close said height control normally open switch; audible and visible signal means connected to said height control normally open switch for actuation upon closure of said height control normally open switch; and means connected to said height control normally open switch for blocking the delivery of grain to said conveyor when said height control normally open switch is closed.

3. An elevator control system as claimed in claim 2 wherein said means connected to said normally open switch for blocking the delivery of grain to said conveyor comprises a solenoid connected to said normally open switch; latching means; a mechanical linkage connecting said latching means to said solenoid; and a gate retained in inoperative position by said latching means and operative upon actuation of said solenoid to block the supply of grain to said conveyor.

4. An elevator control system as claimed in claim 1 wherein said means for indicating the proper alignment of said discharge spout comprises a discharge switch mounted adjacent the top of each of said bins for closure by contact with said discharge spout when said discharge spout is properly aligned for delivery of grain to the bin adjacent the respective discharge switch; and signal means connected to each of said discharge switches for indicating which bin is being filled and when said discharge spout is properly aligned with the bin to which grain is to be delivered.

5. An elevator control system as claimed in claim 1 wherein said means responsive to the speed of said conveyor comprises an electrical circuit; a rotating member engaging said conveyor and rotated by the movement thereof; means mounted on said rotating member and responsive to a predetermined rotational speed thereof to open said circuit; a solenoid connected in said circuit; mechanical means connected to said solenoid; a gate retained in inoperative position by said mechanical means and operative to block the supply of grain to said conveyor when said solenoid is actuated; and means cooperating with said gate to open said circuit when said gate blocks the supply of grain to said conveyor.

6. An elevator control system as claimed in claim 1 wherein said means responsive to the speed of said conveyor comprises a first disc frictionally contacting a moving portion of said conveyor and adapted to be rotated thereby; a shaft coaxially connected to said first disc; a second disc coaxially mounted on said shaft; a second switch mounted on a face of said second disc near its periphery; a contact on said second switch adapted to open said second switch by moving toward the periphery of said disc and to close said second switch by moving toward said shaft; a tension spring biasing said contact to closed position in opposition to a centrifugal force of predetermined magnitude imparted to said contact by the rotation of said second disc; a solenoid connected to said second switch; latching means; a mechanical linkage connecting said latching means to said solenoid; a gate retained in inoperative position by said latching means and operative upon actuation of said solenoid to block the supply of grain to said conveyor; a normally closed third switch connected in series with said second switch and adapted to be opened by said gate when said gate becomes operative upon actuation of said solenoid; and a source of electromotive force connected to said second and third switches and said solenoid through an electrical circuit.

7. In a grain elevator having a plurality of grain storage bins and a vertical bucket-type endless conveyor for delivering grain to said bins, the improvement which comprises a normally open switch mounted in the upper portion of each of said bins; an actuating arm connected to said switch and extending downwardly into the respective bins, said arm being movable in response to contact with the grain in said respective bins to close said switch; audible and visible signal means connected to said switch; and means connected to said switches for halting the delivery of grain to said endless conveyor whereby when one of said switches is closed said audible and visible signal means is actuated and the delivery of grain to said endless conveyor is stopped; and means for selectively disconnecting said means for halting the delivery of grain to said endless conveyor from said one switch.

8. The improvement in a grain elevator as claimed in claim 7 wherein said means for halting the delivery of grain to said endless conveyor comprises a solenoid connected to said normally open switch; latching means; a mechanical linkage connecting said latching means to said solenoid; and a gate retained in inoperative position by said latching means and operative upon actuation of said solenoid to block the supply of grain to said endless conveyor.

9. In a grain elevator of the type having a conveyor for lifting grain to the top of said elevator, the improvement which comprises grain receiving means, said grain receiving means including grain storage bins, and grain weighing scales; grain discharge means for receiving grain from said conveyor and discharging grain into said grain receiving means; and means responsive to the quantity of grain discharging into each of said storage bins and the grain weighing scales for halting the supply of grain to said elevator when a predetermined amount of grain has been received by said grain receiving means.

10. The improvement in a grain elevator claimed in claim 9 and further characterized to include a switch mounted adjacent the top of each of said grain storage bins for closure by contact with said discharge means when said discharge means is properly aligned for delivery of grain to the bin adjacent the respective switch, and signal means connected to each of said switches for indicating when said discharge means is properly aligned with the bin to which grain is to be delivered.

11. The improvement in a grain elevator claimed in claim 9 wherein said grain weighing scales comprise a vertically-movable scale pan counterbalanced for vertical movement when a predetermined quantity of grain is placed in said pan; and wherein said means responsive to the quantity of grain discharging into said grain weighing scales includes switch means adjacent to said scales and cooperating therewith for closure upon vertical movement of said pan in one direction, and for opening upon vertical movement of said scale pan in the opposite direction; signal means; and counter means connected between said switch means and said signal means for counting the number of times said switch means is closed, and for actuating said signal means when said switch means has been closed a predetermined number of times.

References Cited in the file of this patent

UNITED STATES PATENTS

| | | |
|---|---|---|
| 214,953 | Reisert | Apr. 29, 1879 |
| 1,242,482 | Shotwell | Oct. 9, 1917 |
| 1,600,754 | Cary | Sept. 21, 1926 |
| 1,620,532 | Fisher | Mar. 8, 1927 |
| 1,750,552 | Umbreit | Mar. 11, 1930 |
| 1,842,919 | Simmons | Jan. 26, 1932 |
| 1,910,155 | Engst | May 23, 1933 |
| 2,354,647 | Blusson | Aug. 1, 1944 |
| 2,430,407 | Nelson | Nov. 4, 1947 |
| 2,587,854 | Johnson | Mar. 4, 1952 |
| 2,880,890 | Stuller et al. | Apr. 7, 1959 |
| 2,915,205 | Strader | Dec. 1, 1959 |
| 2,931,521 | Hartley | Apr. 5, 1960 |
| 2,938,622 | Mau et al. | May 31, 1960 |
| 3,005,540 | Hinderaker | Oct. 24, 1961 |